(12) United States Patent
Tokutomi et al.

(10) Patent No.: US 10,418,144 B2
(45) Date of Patent: Sep. 17, 2019

(54) CARBON NANOTUBE COMPOSITE MATERIAL AND PROCESS FOR PRODUCING SAME

(71) Applicants: YAZAKI CORPORATION, Tokyo (JP); The University of Tokyo, Tokyo (JP)

(72) Inventors: Junichirou Tokutomi, Shizuoka (JP); Kenichi Hanazaki, Shizuoka (JP); Jun Yanagimoto, Tokyo (JP); Sumio Sugiyama, Tokyo (JP); Junichiro Shiomi, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/279,491

(22) Filed: Sep. 29, 2016

(65) Prior Publication Data

US 2017/0018324 A1    Jan. 19, 2017

Related U.S. Application Data

(63) Continuation of application No. PCT/JP2015/054575, filed on Feb. 19, 2015.

(30) Foreign Application Priority Data

Apr. 8, 2014    (JP) .................................. 2014-079352

(51) Int. Cl.
*H01B 1/04* (2006.01)
*B82Y 30/00* (2011.01)
(Continued)

(52) U.S. Cl.
CPC ................ *H01B 1/04* (2013.01); *B82Y 40/00* (2013.01); *H01B 13/0036* (2013.01); *B22F 3/20* (2013.01);
(Continued)

(58) Field of Classification Search
CPC . B82Y 30/00; H01B 1/22; H01B 1/04; H01B 1/24
(Continued)

(56) References Cited

U.S. PATENT DOCUMENTS

| 4,075,010 A | 2/1978 | Fischer |
| 9,362,022 B2 | 6/2016 | Kamiyama et al. |

(Continued)

FOREIGN PATENT DOCUMENTS

| CN | 1834280 A | 9/2006 |
| CN | 102714073 A | 10/2012 |

(Continued)

OTHER PUBLICATIONS

Correa-Duarte "Aligning Au Nanorods by Using Carbon Nanotubes as Templates." Angew. Chem. Int. Ed. 2005, 44, 4375-4378 Year: 2005).*

(Continued)

*Primary Examiner* — Tri V Nguyen
(74) *Attorney, Agent, or Firm* — Metrolex IP Law Group, PLLC

(57) ABSTRACT

A carbon nanotube composite material includes a metallic base composed of a polycrystalline substance in which a plurality of rod-shaped metallic crystal grains are oriented in a same direction and a carbon nanotube conductive path, which is composed of a carbon nanotube, and forms a conductive path allowing electricity to conduct therethrough in a longitudinal direction of the metallic base by being present in a part of grain boundaries between the rod-shaped metallic crystal grains on a transverse plane of the metallic base, and being present along the longitudinal direction of the metallic base.

2 Claims, 6 Drawing Sheets

(51) Int. Cl.
*B82Y 40/00* (2011.01)
*H01B 13/00* (2006.01)
*B22F 3/20* (2006.01)
*C22C 1/05* (2006.01)
*C22C 1/10* (2006.01)
*C22C 49/14* (2006.01)

(52) U.S. Cl.
CPC ..... *B22F 2201/20* (2013.01); *B22F 2301/052* (2013.01); *B22F 2302/403* (2013.01); *B82Y 30/00* (2013.01); *C22C 1/05* (2013.01); *C22C 1/10* (2013.01); *C22C 49/14* (2013.01); *Y10S 977/742* (2013.01); *Y10S 977/842* (2013.01); *Y10S 977/932* (2013.01)

(58) Field of Classification Search
USPC ........ 252/502, 506, 507, 508, 509; 977/742, 977/810
See application file for complete search history.

(56) References Cited

U.S. PATENT DOCUMENTS

| | | | |
|---|---|---|---|
| 2012/0152480 A1* | 6/2012 | Nayfeh | B22D 17/14 164/61 |
| 2012/0267141 A1 | 10/2012 | Kamiyama et al. | |

FOREIGN PATENT DOCUMENTS

| | | |
|---|---|---|
| JP | S60-8296 B2 | 3/1985 |
| JP | H07-278696 A | 10/1995 |
| JP | H08-81730 A | 3/1996 |
| JP | 2006-147263 A | 6/2006 |
| JP | 2011-171291 A | 9/2011 |
| WO | 2006/120803 A1 | 11/2006 |

OTHER PUBLICATIONS

Yu "Hybrid Structures of Gold Nanorods and Single-Walled Carbon Nanotubes." Oklahoma State University, ProQuest Dissertations Publishing, PhD thesis, May 2011. (Year: 2011).*
Jiang "Strong and ductile carbon nanotube/aluminum bulk nanolaminated composites with two-dimensional alignment of carbon nanotubes." Scripta Materialia 66 (2012) 331-334 (Year: 2012).*
Shukla "Processing of copper—carbon nanotube composites by vacuum hot pressing technique." Materials Science & Engineering A560, 365-371 (Year: 2013).*
Yoo "A combination of ball milling and high-ratio differential speed rolling for synthesizing carbon nanotube/copper composites." C A R B O N 6 1, 4 8 7-5 0 0 (Year: 2013).*
Choi "Reinforcement with carbon nanotubes in aluminum matrix composites." Scripta Materialia 59 (2008) 360-363 (Year: 2008).*
The Japanese office action dated May 8, 2018 in a counterpart Japanese Patent application.
The office action dated Jul. 3, 2017 in the counterpart Chinese patent application.
An office action dated Jan. 17, 2018 in a counterpart Chinese patent application.
An office action dated Aug. 9, 2018 in a counterpart Chinese patent application.

* cited by examiner

CARBON NANOTUBE COMPOSITE MATERIAL AND PROCESS FOR PRODUCING SAME

CROSS REFERENCE TO RELATED APPLICATION

This application is a Continuation of PCT Application No. PCT/JP2015/054575, filed on Feb. 19, 2015, and claims the priority of Japanese Patent Application No. 2014-079352, filed on Apr. 8, 2014, the content of all of which is incorporated herein by reference.

BACKGROUND

1. Technical Field

The present invention relates to a carbon nanotube composite material and a process for producing same.

2. Related Art

Heretofore, as a method for enhancing strength of a metal material, there has been performed a method of mixing second metal, which is different from base metal of the metal material, with the metal material. However, there is a problem that conductivity of the metal material decreases to a large extent when the metal material is mixed with the second metal.

Accordingly, a carbon nanotube composite material attracts attention. A carbon nanotube has high strength, and in addition, performs ballistic conduction, and accordingly, it is expected that the strength and conductivity thereof will be enhanced in comparison with those of the metal material. At present, a variety of carbon nanotube composite materials are proposed.

For example, in Patent Literature 1, a composite material wire is described, which has a cellulation structure including: a partition wall portion including the carbon nanotube; and a partition wall inner portion that is covered with the partition wall portion and is composed of an aluminum material or the like. In this composite material wire, a compounding ratio of the carbon nanotube to the aluminum material is 0.2 mass % or more to 5 mass % or less.

Production of the composite material wire described in Patent Literature 1 is performed as follows. That is to say, first, a mixture, which contains aluminum powder, the carbon nanotube and elastomer, is subjected to heat treatment, whereby the elastomer is vaporized to obtain a porous body. Next, the porous body is subjected to plasma sintering in a can, and a billet is fabricated. Moreover, this billet is subjected to extrusion molding, and is annealed at 500° C., whereby the composite material wire is obtained.

Patent Document 1: Japanese Unexamined Patent Application Publication No. JP 2011-171291 A

SUMMARY

However, the composite material wire described in Patent Literature 1 has had a problem that conductivity thereof is low. This is considered to be because an oxide film is formed on a surface of each particle of the aluminum powder to increase electrical resistance of the composite material wire, and because an air gap in the porous body or the billet remains as a void in the composite material wire.

Moreover, the composite material wire described in Patent Literature 1 has had a problem that a residue, which is generated in an event of vaporizing the elastomer, remains on a surface of the composite material wire, thus making it easy to decrease the conductivity of the composite material wire.

Furthermore, since the compounding ratio of the carbon nanotube to the aluminum material is 0.2 mass % or more to 5 mass % or less, the composite material wire described in Patent Literature 1 has had a problem that a compounding amount of the carbon nanotube is large to increase production cost.

Moreover, the composite material wire described in Patent Literature 1 requires, as a processing time, approximately three hours for vaporizing the elastomer and approximately 20 minutes for the plasma sintering, and has had a problem that a time required for the production thereof is long.

The present invention has been made in consideration of the above-described circumstances, and it is an object of the present invention to provide a carbon nanotube composite material, which has high conductivity and a small compounding amount of the carbon nanotube. It is another object of the present invention to provide a process for producing the carbon nanotube composite material, which has high conductivity and a small compounding amount of the carbon nanotube, in a short time.

A first aspect of the present invention provides a carbon nanotube composite material including: a metallic base composed of a polycrystalline substance in which a plurality of rod-shaped metallic crystal grains are oriented in a same direction; and a carbon nanotube conductive path, which is composed of a carbon nanotube, and forms a conductive path allowing electricity to conduct therethrough in a longitudinal direction of the metallic base by being present in a part of grain boundaries between the rod-shaped metallic crystal grains on a transverse plane of the metallic base, and being present along the longitudinal direction of the metallic base.

A second aspect of the present invention provides a carbon nanotube composite material, wherein the carbon nanotube conductive path is contained by 0.1 to 1 mass % with respect to the metallic base.

A third aspect of the present invention provides a process for producing a carbon nanotube composite material including; a green compact forming step of forming a powder green compact by applying a pressure to mixed powder containing metal powder and a carbon nanotube; and an extrusion processing step of implementing extrusion processing for the powder green compact under vacuum atmosphere, at 400° C. or more, and at a strain rate of 0.1 to 100 $s^{-1}$.

A fourth aspect of the present invention provides a process for producing a carbon nanotube composite material, wherein the mixed powder contains the carbon nanotube by 0.1 to 1 mass % with respect to the metal powder.

A fifth aspect of the present invention provides a process for producing a carbon nanotube composite material, wherein a pressure applied to the mixed powder in the green compact forming step is equal to or more than a yield stress of the metal powder in the mixed powder and equal to or less than a maximum stress of the metal powder in the mixed powder.

DETAILED DESCRIPTION

[Carbon Nanotube Composite Material]

A description is made below of a carbon nanotube composite material of this embodiment with reference to the drawings.

Figure 1:
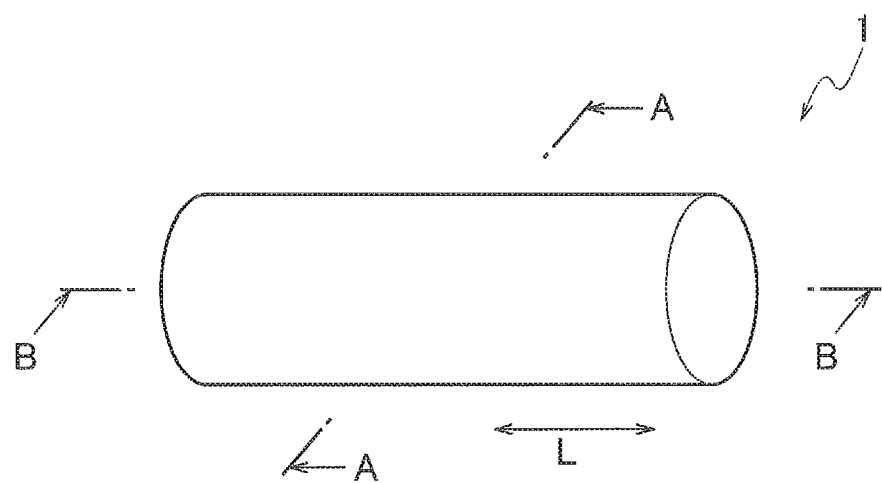
FIG. 1 is a perspective view showing a part of a carbon nanotube composite material according to an embodiment of the present invention.
Figure 2:
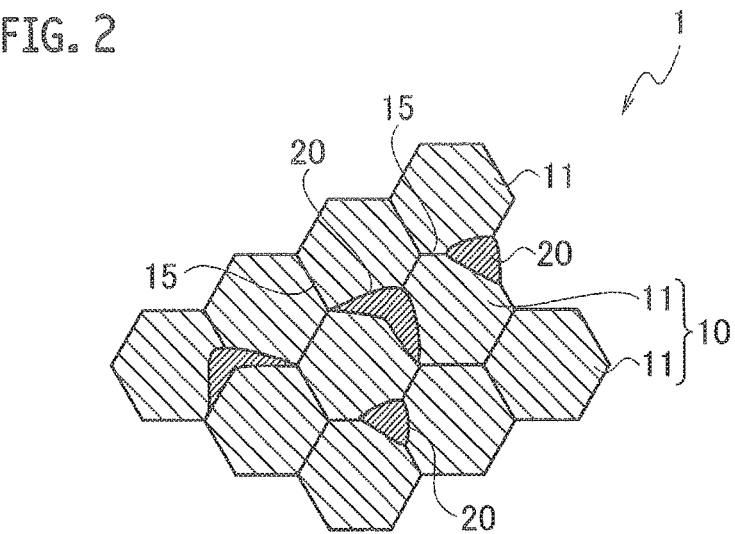
FIG. 2 is a cross-sectional view schematically showing a cross section along a line A-A of FIG. 1.
Figure 3:
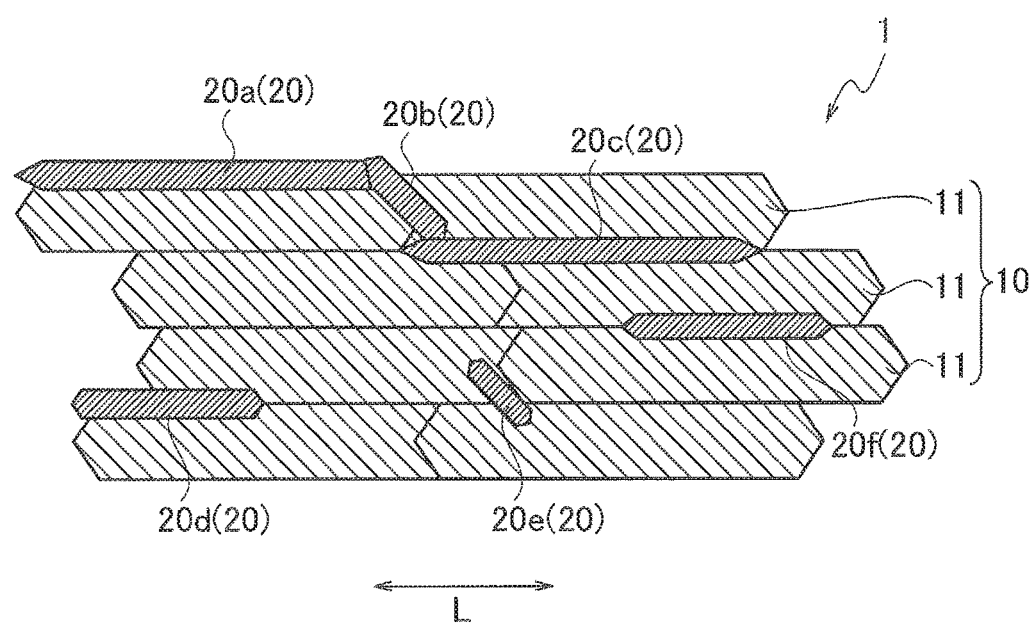
FIG. 3 is a cross-sectional view schematically showing a cross section along a line B-B of FIG. 1.

FIG. 1 is a perspective view showing a part of the carbon nanotube composite material according to the embodiment of the present invention. Note that such a carbon nanotube composite material 1 is a wire extended in a longitudinal direction, and FIG. 1 shows only a part, which is obtained by cutting both ends of the carbon nanotube composite material 1 along such a longitudinal direction L. FIG. 2 is a cross-sectional view schematically showing a cross section along a line A-A of FIG. 1. FIG. 3 is a cross-sectional view schematically showing a cross section along a line B-B of FIG. 1.

As shown in FIG. 2 and FIG. 3, the carbon nanotube composite material 1 of this embodiment includes: a metallic base 10; and carbon nanotube conductive paths 20.

(Metallic Base)

The metallic base 10 is composed of a polycrystalline substance in which a plurality of rod-shaped metallic crystal grains 11 are oriented in a same direction.

For example, the rod-shaped metallic crystal grains 11 are made of metal such as aluminum, an aluminum alloy, copper, and a copper alloy. These types of the metal of the metallic crystal grains are preferable since conductivity thereof is high. Note that the rod-shaped metallic crystal grains 11 may contain inevitable impurities. A concentration of the inevitable impurities in the rod-shaped metallic crystal grains 11 is a 10 mass % or less.

In the present invention, the rod-shaped metallic crystal grains 11 stand for rod-shaped metallic crystal grains with an aspect ratio of 1 or more. The aspect ratio is defined as a ratio of a long side (longitudinal length of the rod-shaped metallic crystal grains) and a short side (lateral length of the rod-shaped metallic crystal grains). The aspect ratio can be measured by a scanning electron microscope (SEM).

A cross-sectional shape of the rod-shaped metallic crystal grains 11 is not particularly limited. Note that FIG. 2 shows a case where the cross-sectional shape of the rod-shaped metallic crystal grains 11 is a hexagon; however, the cross-sectional shape of the rod-shaped metallic crystal grains 11 may by a shape other than the hexagon.

For example, a length of the rod-shaped metallic crystal grains 11 is 0.1 to 200 µm. Here, the length of the rod-shaped metallic crystal grains 11 stands for a longitudinal length of the rod-shaped metallic crystal grains. Moreover, with regard to the rod-shaped metallic crystal grains 11, for example, a circle equivalent diameter of the crystal grains thereof is 0.1 to 100 µm. Here, the circle equivalent diameter of the crystal grains of the rod-shaped metallic crystal grains 11 stands for an average crystal grain diameter on a transverse plane of the rod-shaped metallic crystal grains 11. In a case where the length and circle equivalent diameter of the rod-shaped metallic crystal grains 11 are within the ranges described above, and as the metallic crystal grains 11 are finer, strength of the metallic base 10 is higher.

The metallic base 10 is formed as such a polycrystalline substance, in which the plurality of these rod-shaped metallic crystal grains 11 are oriented in the same direction, and the rod-shaped metallic crystal grains 11 adjacent to one another are coupled to one another on grain boundaries. Here, that the plurality of rod-shaped metallic crystal grains 11 are oriented in the same direction stands for that longitudinal directions of the rod-shaped metallic crystal grains 11 are directed in the same direction.

Incidentally, the carbon nanotube composite material 1 of this embodiment is one produced by being subjected to an extrusion processing along the longitudinal direction L shown in FIG. 1 and FIG. 3. In FIG. 3, the plurality of rod-shaped metallic crystal grains 11 are oriented in a same direction as the longitudinal direction L.

A reason why the plurality of rod-shaped metallic crystal grains 11 are oriented in the same direction as the longitudinal direction L is that metallic crystal grains which are not arrayed in a specific direction are drawn in the same direction by the extrusion processing in an event of the production.

Note that, although the carbon nanotube composite material 1 of this embodiment is produced by subjected to the extrusion processing; however, the carbon nanotube composite material of the present invention may be produced by a method other than the extrusion processing.

(Carbon Nanotube Conductive Path)

As shown in FIG. 2 and FIG. 3, in the carbon nanotube composite material 1, on a part of grain boundaries 15 between the rod-shaped metallic crystal grains 11, carbon nanotube conductive paths 20 are present. A plurality of the carbon nanotube conductive paths 20 are formed in the carbon nanotube composite material 1.

The carbon nanotube conductive paths 20 are composed of carbon nanotubes, and form conductive paths which allow electricity to conduct therethrough in a longitudinal direction of the metallic base 10. The carbon nanotube conductive paths 20 are composed of one or more carbon nanotubes. Those known in public can be used as the carbon nanotubes which compose the carbon nanotube conductive paths 20. A diameter of the carbon nanotubes is, for example, 0.4 to 50 nm. An average length of the carbon nanotubes is, for example, 1 µm or more.

As each of the carbon nanotubes which compose the carbon nanotube conductive paths 20, one or two or more carbon nanotubes may be present in an extended state, or the carbon nanotubes may be aggregated in a massive form.

As shown in FIG. 2, the carbon nanotube conductive paths 20 are present on a part of the grain boundaries 15 between the rod-shaped metallic crystal grains 11 on a transverse plane of the metallic base 10. That is to say, on the transverse plane of the metallic base 10, the carbon nanotube conductive paths 20 are not present in a whole of the grain boundaries 15 of the rod-shaped metallic crystal grains 11. Therefore, the carbon nanotube conductive paths 20 do not have a structure of covering peripheries of the rod-shaped metallic crystal grains 11. Moreover, as shown in FIG. 2, in the case where the plurality of carbon nanotube conductive paths 20 are present, in usual, the carbon nanotube conductive paths 20 are present so as to be spaced apart from one another.

Note that, as a conventional carbon nanotube composite material, one is known, which has a so-called cellulation structure in which entire peripheries of the rod-shaped metallic crystal grains are covered with the carbon nanotube conductive paths. This cellulation structure is a structure in which the rod-shaped metallic crystal grains enter cells which form the carbon nanotube conductive paths. In usual, the cellulation structure is formed as a honeycomb-like structure, which is composed of a plurality of cells, and in addition, is composed in such a manner that two cells adjacent to each other are bonded to each other so as to share a wall surface. In this cellulation structure, a structure is formed, in which the carbon nanotube conductive paths are present on the whole of the grain boundaries between the rod-shaped metallic crystal grains.

In contrast, in the carbon nanotube composite material 1 according to this embodiment, on the transverse plane of the metallic base 10, the carbon nanotube conductive paths 20 are present only on a part of the grain boundaries 15 between the rod-shaped metallic crystal grains 11, and are not present on the whole of the grain boundaries 15. Therefore, in the carbon nanotube composite material 1 according to this embodiment, the carbon nanotube conductive paths 20 do not form such cells which cover the rod-shaped metallic crystal grains 11, and the carbon nanotube composite material 1 has an apparently different structure from the cellulation structure.

As shown in FIG. 3, the carbon nanotube conductive paths 20 are present along the longitudinal direction L of the metallic base 10, and thereby form conductive paths which allow electricity to conduct therethrough in the longitudinal direction of the metallic base 10. Note that, in the carbon nanotube composite material 1, the carbon nanotube conductive paths 20 are present continuously, intermittently, or both continuously and intermittently along the longitudinal direction L of the metallic base 10.

For example, in FIG. 3, three carbon nanotube conductive paths 20a, 20b and 20c are present continuously along the longitudinal direction L. Here, that the carbon nanotube conductive paths are present continuously stands for that the carbon nanotube conductive paths 20 adjacent to one another in the longitudinal direction L contact one another.

Moreover, in FIG. 3, three carbon nanotube conductive paths 20d, 20e and 20f are present intermittently along the longitudinal direction L. Here, that the carbon nanotube conductive paths are present intermittently stands for that the carbon nanotube conductive paths 20 adjacent to one another in the longitudinal direction L do not contact one another.

Note that, with regard to the carbon nanotube conductive paths 20, at least a part of the carbon nanotube conductive paths 20 just needs to be present along the longitudinal direction L of the metallic base 10. Therefore, it is not necessary that all of the carbon nanotube conductive paths 20 should be present along the longitudinal direction L of the metallic base 10. For example, in the carbon nanotube composite material 1 according to this embodiment, an orientation direction of a part of the carbon nanotube conductive paths 20 does not have to go along the longitudinal direction L of the metallic base 10. In this case, an orientation direction of the carbon nanotube conductive paths 20 in the carbon nanotube composite material 1 becomes random.

As described above, in the carbon nanotube composite material 1 according to this embodiment, the plurality of carbon nanotube conductive paths 20 are not necessarily present continuously along the longitudinal direction L of the metallic base 10. However, since the metallic base 10 itself has conductivity, it is possible to make conduction through the metallic base 10 even if the carbon nanotube conductive paths 20 are spaced apart from one another.

In the carbon nanotube composite material 1 according to this embodiment, with respect to the metallic base 10, the carbon nanotube conductive paths 20 are contained by usually 0.1 to 1 mass %, preferably 0.2 to 0.8 mass %, more preferably 0.5 to 0.8 mass %. Here, 1 mass % stands for that the carbon nanotube conductive paths 20 are contained by 1 mass part with respect to 100 mass parts of the metallic base 10. Note that 100 mass parts of the metallic base 10 have same meaning as 100 mass parts of the rod-shaped metallic crystal grains 11.

When a content of the carbon nanotube conductive paths 20 is within the above-described range, it becomes easy to achieve such a situation where the carbon nanotube composite material 1 becomes present in a part of the grain boundaries 15 between the rod-shaped metallic crystal grains 11 on the transverse plane of the metallic base 10.

Note that, in the carbon nanotube composite material with the conventional cellulation structure, the carbon nanotube conductive paths form wall surfaces of cells. Therefore, in the carbon nanotube composite material with the conventional cellulation structure, the content of the carbon nanotube conductive paths is substantially as large as approximately 1 to 5 mass %.

In contrast, the carbon nanotube composite material 1 according to this embodiment does not adopt the cellulation structure, and the carbon nanotube conductive paths 20 just need to be present in a part of the grain boundaries 15 between the rod-shaped metallic crystal grains 11 on the transverse plane of the metallic base 10. Therefore, the carbon nanotube composite material 1 according to this embodiment can reduce the content of the carbon nanotube conductive paths 20.

Figure 4A:
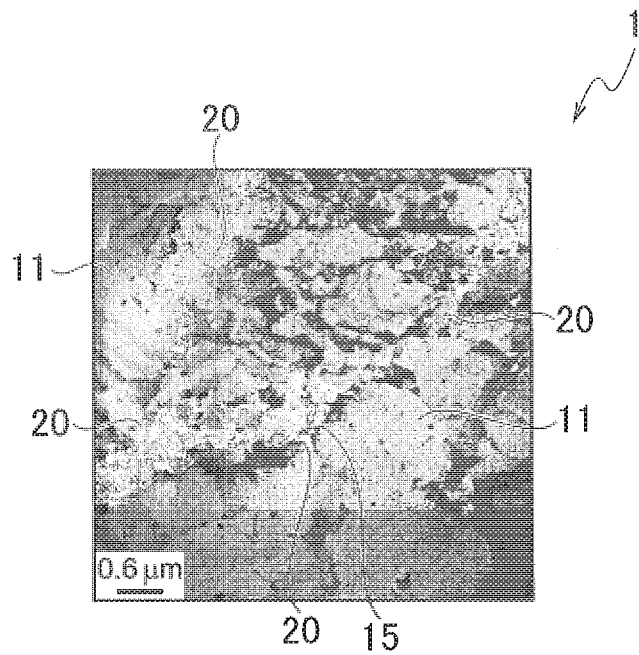
FIGS. 4A and 4B are both examples of transmission electron microscope (TEM) photographs of a transverse plane of the carbon nanotube composite material according to the embodiment of the present invention.
Figure 4B:
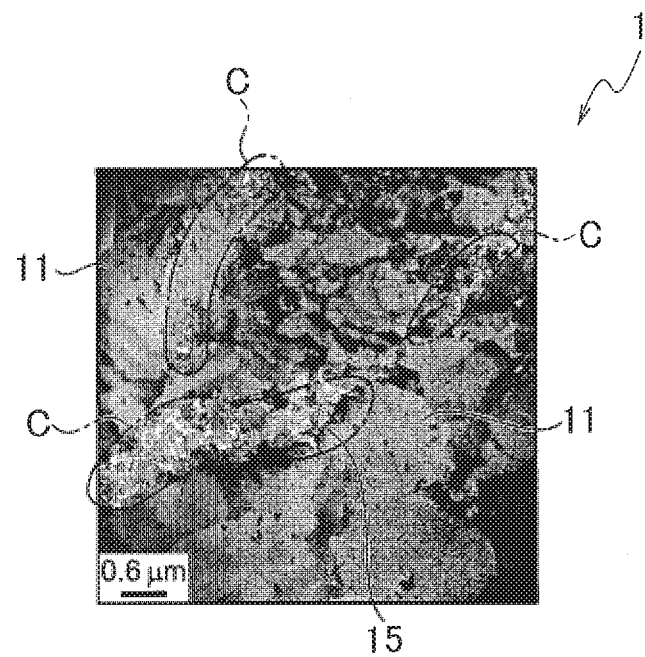

With regard to the carbon nanotube composite material 1 according to this this embodiment, examples of cross section photographs thereof are shown. FIGS. 4A and 4B are both examples of transmission electron microscope (TEM) photographs of the transverse plane of the carbon nanotube composite material according to the embodiment of the present invention. FIGS. 4A and 4B are both examples of TEM photographs of the transverse plane of the carbon nanotube composite material 1, that is, a cross section obtained by cutting the carbon nanotube composite material 1 along a plane perpendicular to the longitudinal direction thereof. Note that FIGS. 4A and 4B are a same TEM photograph, in which only assigned reference symbols and numerals are changed. Moreover, FIG. 4 is a TEM photograph of a transverse plane of Example 1 to be described later.

As shown in FIG. 4A, on the transverse plane of the carbon nanotube composite material 1, the carbon nanotube conductive paths 20 are present in a part of the grain boundary 15 between the rod-shaped metallic crystal grains 11.

FIG. 4B is a photograph that shows a region of FIG. 4A, where the carbon nanotube conductive paths 20 are present, by reference symbol C. From FIG. 4B, it is understood that the carbon nanotube conductive paths 20, which are present in the region denoted by reference symbol C, are not present in the whole of the grain boundaries 15 between the rod-shaped metallic crystal grains 11, but are present in a part of the grain boundaries 15.

Figure 5:
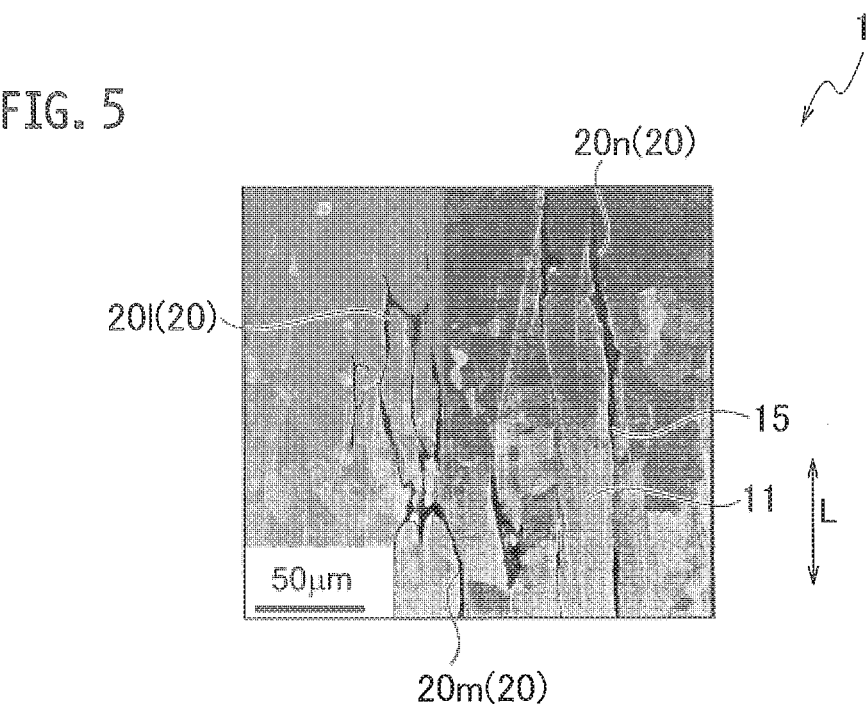
FIG. 5 is an example of a scanning electron microscope (SEM) photograph of a longitudinal cross section of the carbon nanotube composite material according to the embodiment of the present invention.
Figure 6:
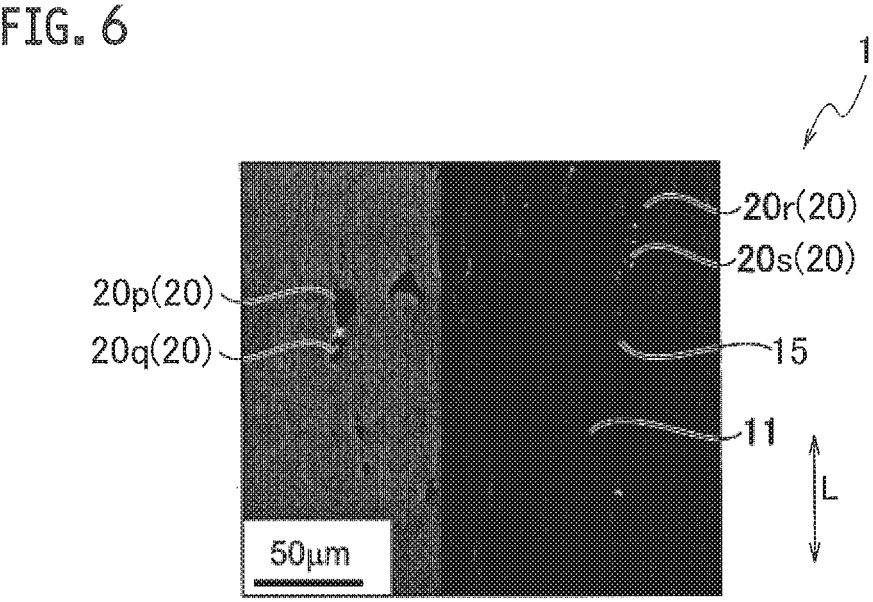
FIG. 6 is another example of the scanning electron microscope (SEM) photograph of the longitudinal cross section of the carbon nanotube composite material according to the embodiment of the present invention.

FIG. 5 is an example of a scanning electron microscope (SEM) photograph of a longitudinal cross section of the carbon nanotube composite material according to the embodiment of the present invention. FIG. 6 is another example of the scanning electron microscope (SEM) photograph of the longitudinal cross section of the carbon nanotube composite material according to the embodiment of the present invention. That is to say, FIGS. 5 and 6 are examples of SEM photographs of the longitudinal cross section of the carbon nanotube composite material 1, that is, a cross section obtained by cutting the carbon nanotube composite material 1 along a plane parallel to the longitudinal direction thereof. Note that FIGS. 5 and 6 are SEM photographs of a longitudinal cross section of Example 1 to be described later.

Specifically, FIG. 5 is a photograph showing a state where the plurality of carbon nanotube conductive paths 20 are formed in a network fashion. Moreover, FIG. 6 is a photograph showing a state where the plurality of carbon nanotube conductive paths 20 are aggregated in a ball shape, and are not formed in the network fashion.

As shown in FIG. 5, the carbon nanotube conductive paths 20 are present along the longitudinal direction L of the metallic base 10, and thereby form conductive paths which allow electricity to conduct therethrough in the longitudinal direction of the metallic base 10. Note that, in the carbon nanotube composite material 1, the carbon nanotube conductive paths 20 are present continuously, intermittently, or both continuously and intermittently along the longitudinal direction L of the metallic base 10. For example, in FIG. 5, three carbon nanotube conductive paths 20l, 20m and 20n are present continuously along the longitudinal direction L.

In FIG. 6, carbon nanotube conductive paths 20p, 20q, 20r and 20s are formed in a massive form as a result of aggregation of the carbon nanotubes. The fact that the carbon nanotube conductive paths 20 are formed in the massive form can be determined from the fact that the carbon nanotube conductive paths 20 are not formed in such a shape extended along the longitudinal direction L. Moreover, in FIG. 6, two carbon nanotube conductive paths 20p and 20q are present intermittently along the longitudinal direction L. Furthermore, in FIG. 6, two carbon nanotube conductive paths 20r and 20s are present intermittently along the longitudinal direction L.

The carbon nanotube composite material 1 according to this embodiment has high conductivity and a small compounding amount of the carbon nanotube. Note that a reason why the conductivity of the carbon nanotube composite material 1 is increased is considered to be because, since the carbon nanotube composite material 1 does not have the cellulation structure, it is not necessary to use elastomer in an event of production of the carbon nanotube composite material 1, and a residue generated by vaporization of the elastomer is not present.

[Process for Producing Carbon Nanotube Composite Material]

Next, a description is made of a process for producing the carbon nanotube composite material according to the embodiment with reference to the drawings.

The process for producing the carbon nanotube composite material according to this embodiment includes: a green compact forming step; and an extrusion processing step.

(Green Compact Forming Step)

The green compact forming step is a step of forming a powder green compact by applying a pressure to mixed powder containing metal powder and the carbon nanotube.

<Metal Powder>

As the metal powder, for example, aluminum powder, aluminum alloy powder, copper powder or copper alloy powder is used. These types of the metal powder are preferable since conductivity thereof is high. A mean particle diameter $D_{50}$ of the metal powder is, for example, 1 to 500 μm, preferably 3 to 300 μm. Here, $D_{50}$ stands for a median diameter. When the mean particle diameter $D_{50}$ of the metal powder is within the above-described range, it is easy to obtain the carbon nanotube composite material 1 of this embodiment. Moreover, the metal powder may be a mixture of plural types of metal powder different in mean particle diameter $D_{50}$. If the metal powder is the mixture of the plural types of metal powder different in mean particle diameter $D_{50}$, then gaps between metal powder particles become small, and accordingly, it is easy to form the powder green compact.

<Carbon Nanotube>

As the carbon nanotube, a same one as that for use in the carbon nanotube composite material of this embodiment is used. Note that the carbon nanotube may be one, from which a metal catalyst such as platinum and amorphous carbon are removed by being washed using an acid in advance, or may be one that is graphitized by being subjected to high-temperature treatment in advance. When such pre-treatment as described above is implemented for the carbon nanotube, purity and crystallinity of the carbon nanotube can be enhanced. Items other than these are same as those described in the carbon nanotube composite material of this embodiment, and accordingly, a description thereof with regard to the carbon nanotube is omitted.

<Mixed Powder>

The mixed powder is powder containing the metal powder and the carbon nanotube. For example, the mixed powder is obtained by a method of mixing the metal powder and the carbon nanotube with each other in a solvent such as an alcohol-based solvent and vaporizing the solvent.

With respect to the metal powder, the mixed powder contains the carbon nanotube usually by 0.1 to 1 mass %, preferably 0.2 to 0.8 mass %, more preferably 0.5 to 0.8 mass %. Here, 1 mass % stands for that the carbon nanotube is contained by 1 mass part with respect to 100 mass parts of the metal powder.

In the green compact forming step, the powder green compact is formed by applying a pressure to the above-described mixed powder and pressing the mixed powder. In the green compact forming step, the mixed powder is pressed so that the gaps between the metal powder particles in the mixed powder can become minimum. A method known in public can be used as a method of applying a pressure to the mixed powder, and for example, there is used a method of pouring the mixed powder into a cylindrical green compact forming container, and thereafter, pressurizing the mixed powder in this container.

In the obtained powder green compact, the carbon nanotube is usually present in the gaps between the pressed metal powder particles. As the carbon nanotube, one or two or more carbon nanotubes may be present in an extended state, or may be aggregated in a massive form as long as the carbon nanotube is present in the gaps between the metal powder particles.

Figure 7:
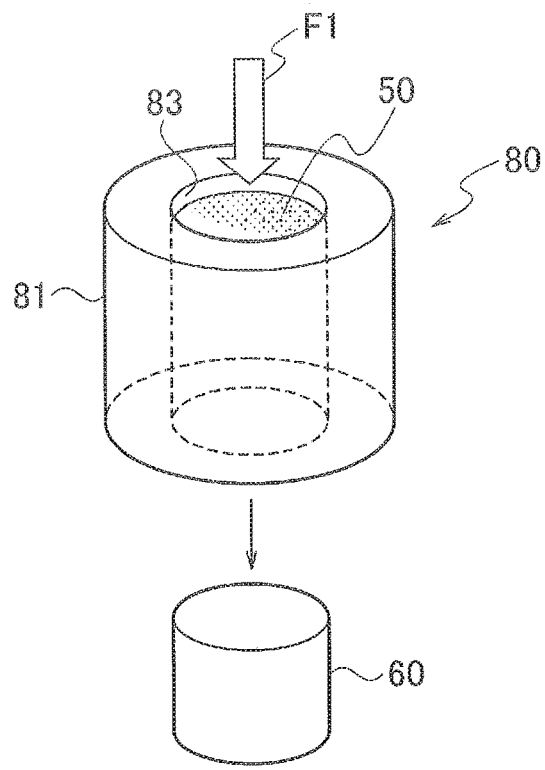
FIG. 7 is a view showing an example of a green compact forming step.

A description is made of the green compact forming step with reference to the drawings. FIG. 7 is a view showing an example of the green compact forming step. A green compact forming container 80 shown in FIG. 7 is a container for forming a powder green compact 60 by applying a pressure to the mixed powder 50. The green compact forming container 80 is composed of a cylindrical container body 81 provided with a columnar cavity portion 83 that penetrates the container body 81 in an axial direction.

In the green compact forming step, first, the green compact forming container 80 is mounted on a bottom plate (not shown). At this time, the green compact forming container 80 is mounted so that a gap cannot occur between a bottom surface of the green compact forming container 80 and a surface of the bottom plate. Next, the mixed powder 50 is poured into the cavity portion 83 of the green compact forming container 80 in which a bottom portion side is closed by the bottom plate. Moreover, a pressure is applied by force of reference symbol F1 to the mixed powder 50 in the cavity portion 83, and the mixed powder 50 is pressed, whereby the powder green compact 60 is formed.

The pressure applied to the mixed powder 50 by the force of reference symbol F1 in the green compact forming step is set equal to or more than a yield stress of the metal powder in the mixed powder 50 and equal to or less than a maximum stress thereof. For example, in a case where the metal powder in the mixed powder 50 is aluminum powder, a pressure is applied to the mixed powder 50 so that the pressure can become equal to or more than a yield stress of the aluminum powder and equal to or less than a maximum stress thereof. If the pressure applied to the mixed powder 50 is set equal to or more than the yield stress of the metal powder in the mixed powder 50 and equal to or less than the maximum stress thereof, then the powder green compact 60 is formed, in which the mixed powder 50 is pressed so that the gaps between the metal powder pieces in the mixed powder 50 can become minimum.

Here, the yield stress stands for a stress at a boundary point between elastic deformation and plastic deformation. That is to say, with regard to a metal material such as metal powder, in usual, in a region with a small strain amount, a stress is increased in proportion as the strain amount is increased (elastic deformation); however, the stress stops being increased in proportion as the strain amount is increased when the strain amount exceeds a predetermined strain amount (plastic deformation). This stress at the predetermined strain amount is referred to as the yield stress. Moreover, the maximum stress stands for a maximum value of the stress at both regions of the elastic deformation and the plastic deformation. The maximum stress of the metal material is usually present in the plastic deformation region.

Figure 8:
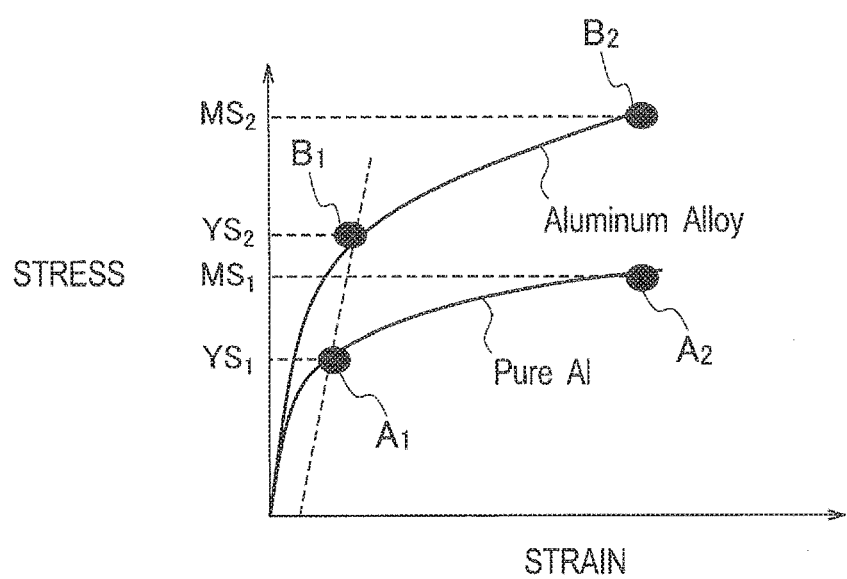
FIG. 8 is a diagram explaining a range of a pressure applied to mixed powder in the green compact forming step.

With reference to the drawing, a description is made of the matter that the pressure applied to the mixed powder 50 is equal to or more than the yield stress of the metal powder and equal to or less than the maximum stress thereof. FIG. 8 is a diagram explaining a range of the pressure applied to the mixed powder in the green compact forming step. Specifically, FIG. 8 is a graph showing a stress-strain chart in a case where the metal power is pure Al (aluminum) and a case where the metal powder is an aluminum alloy. Note that the stress-strain chart of FIG. 8 is a semi-logarithmic graph in which an axis indicating the stress is displayed by logarithm.

As shown in FIG. 8, in a case where the metal powder is composed of pure Al (aluminum), the yield stress becomes $YS_1$ that is a stress at a point $A_1$, and the maximum stress becomes $MS_1$ that is a stress at a point $A_2$. Therefore, in the case where the metal powder contained in the mixed powder 50 is composed of pure Al (aluminum), the pressure applied to the mixed powder 50 in the green compact forming step is set equal to or more than the yield stress $YS_1$ and equal to or less than the maximum stress $MS_1$. Note that, while a region between a point 0 and the point $A_1$ on a stress-strain curve of pure Al of FIG. 8 is shown as a curve, this region is an elastic deformation region in which the stress becomes proportional to an increase of the strain amount. A reason why this region is shown as a curve is because FIG. 8 is a semi-logarithmic graph.

Moreover, in a case where the metal powder is composed of an aluminum alloy, the yield stress becomes $YS_2$ that is a stress at a point $B_1$, and the maximum stress becomes $MS_2$ that is a stress at a point $B_2$. Therefore, in the case where the metal powder contained in the mixed powder 50 is composed of an aluminum alloy, the pressure applied to the mixed powder 50 in the green compact forming step is set equal to or more than the yield stress $YS_2$ and equal to or less than the maximum stress $MS_2$. Note that, in a similar way to the above-described region between the point 0 and the point $A_1$, a region between the point 0 and the point $B_1$ on a stress-strain curve of the aluminum alloy of FIG. 8 is an elastic deformation region.

Processing for applying a pressure to the mixed powder 50 in the green compact forming step is usually performed at ordinary temperature. Moreover, a time of applying a pressure to the mixed powder 50 in the green compact forming step is usually 5 to 60 seconds, preferably 10 to 40 seconds. In this step, the mixed powder 50 does not contain organic matter such as elastomer that requires several hours of heat treatment, and there is implemented physical processing for forming the powder green compact 60 by pressing the mixed powder 50, and accordingly, the time of applying a pressure to the mixed powder 50 can be set to an extremely short time.

When a pressure within a predetermined range is applied to the mixed powder 50 in the green compact forming step, the powder green compact 60 is formed of the mixed powder 50 in the cavity portion 83 of the green compact forming container 80. The powder green compact 60 is ejected from the cavity portion 83 of the green compact forming container 80, for example, by being protruded. The obtained powder green compact 60 is used in the extrusion processing step that is a next step.

(Extrusion Processing Step)

The extrusion processing step is a step of performing the extrusion processing for the powder green compact 60 under vacuum atmosphere, at 400° C. or more, and at a strain rate of 0.1 to 100 $s^{-1}$.

In the extrusion processing step, the powder green compact 60 is heated and subjected to the extrusion processing, whereby the carbon nanotube composite material 1 is obtained. A method known in public can be used as a method of implementing the extrusion processing for the powder green compact 60, and for example, there is used a method of pouring the powder green compact 60 into a cylindrical extrusion processing device, and thereafter, heating the powder green compact 60 in this container and implementing the extrusion processing therefor.

Figure 9:
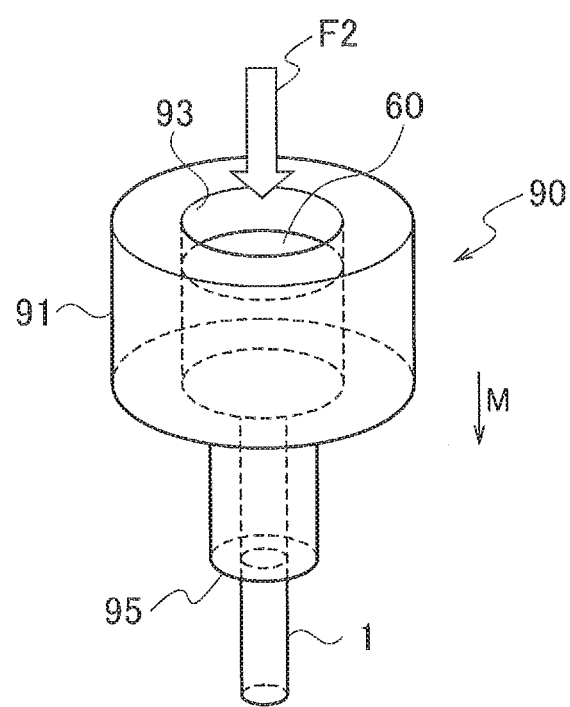
FIG. 9 is a view showing an example of an extrusion processing step.

A description is made of the extrusion processing step with reference to the drawing. FIG. 9 is a view showing an example of the extrusion processing step. An extrusion processing device 90 shown in FIG. 9 is a device for forming the carbon nanotube composite material 1 by heating the powder green compact 60 and implementing the extrusion processing therefor. The extrusion processing device 90 includes: a cylindrical device body 91 provided with a columnar cavity portion 93 into which the powder green compact 60 is charged; and a die 95, which is provided on a bottom portion of the device body 91, and ejects an extrusion workpiece.

In the extrusion processing step, the powder green compact 60 charged into the cavity portion 93 of the extrusion processing device 90 is heated under vacuum atmosphere, thereafter, is applied with force of reference symbol F2, and is extruded from the die 95 in an extrusion direction M. Note that such an atmosphere in the extrusion processing step may be set to an inert gas atmosphere in place of the vacuum atmosphere.

The heating of the powder green compact 60 is performed so that the temperature of the powder green compact 60 can become usually 400° C. or more, preferably 400 to 700° C., more preferably 400 to 660° C., still more preferably 400 to 650° C. If the temperature of the powder green compact 60 is less than 400° C., then it becomes difficult to implement the extrusion processing. Moreover, if the temperature of the powder green compact 60 exceeds 660° C., then it is apprehended that aluminum carbide may be generated in the carbon nanotube composite material 1.

Moreover, the heating of the powder green compact 60 is performed so that a time while the temperature of the powder green compact 60 is within the above-described temperature range can become usually 0.3 to 5 minutes, preferable 0.5 to 3 minutes. In this step, the powder green compact 60 does not contain organic matter such as elastomer that requires several hours of heat treatment, and the carbon nanotube composite material 1 obtained in this step does not have the cellulation structure, either. Therefore, in this step, such a heating time of the powder green compact 60 can be set to an extremely short time.

The strain rate of the heated powder green compact 60 at the extrusion processing time is usually 0.1 to 100 $s^{-1}$, preferably 0.3 to 3 $s^{-1}$. If the strain rate is within this range, then the obtained carbon nanotube composite material 1 becomes one provided with the structure and characteristics of the carbon nanotube composite material according to this embodiment.

An extrusion ratio at the extrusion processing time is usually 4 or more. If the extrusion ratio is less than 4, then it is apprehended that sintering of the powder green compact 60 may become insufficient. Here, the extrusion ratio stands for a ratio of a cross-sectional area of the transverse plane of the powder green compact 60 with respect to a cross-sectional area of the transverse plane of the carbon nanotube composite material 1 that is an extrusion material.

The carbon nanotube composite material 1 obtained through the above-described extrusion processing has a same or similar structure to that of the carbon nanotube composite material 1 of this embodiment. Therefore, a description of the carbon nanotube composite material 1 is omitted.

The process for producing a carbon nanotube composite material according to this embodiment can produce the carbon nanotube composite material, which has high conductivity and a small compounding amount of the carbon nanotube, in a short time. Note that a reason why the conductivity of the carbon nanotube composite material 1 is increased is considered to be because, since the carbon nanotube composite material 1 does not have the cellulation structure, it is not necessary to use elastomer in the event of the production of the carbon nanotube composite material 1, and the residue generated by the vaporization of the elastomer is not present. Moreover, a reason why the carbon nanotube composite material 1 can be produced in a short time is because a vaporization operation of the elastomer is unnecessary, and the carbon nanotube composite material 1 can be produced in approximately 2 minutes even if the green compact forming step and the extrusion processing step are included therein.

EXAMPLES

The present invention will be described below more in detail by examples and comparative examples; however, the present invention is not limited to these examples.

Example 1

(Green Compact Forming Step)

First, 100 mass parts of aluminum powder with purity of 99.9% and a mean particle diameter $D_{50}$ of 50 μm and 1 mass part of a carbon nanotube with a diameter of approximately 40 nm and an average length of approximately 5 μm were mixed with each other in an alcohol-based solvent. Thereafter, the alcohol-based solvent was vaporized, and mixed powder containing the aluminum powder and the carbon nanotube was prepared.

Next, the mixed powder was poured into the cavity portion 83 of the green compact forming container 80 shown in FIG. 7, and a pressure was applied to the mixed powder at ordinary temperature (20° C.) for 20 seconds. Note that a pressure equal to or more than the yield stress of the aluminum powder in the mixed powder and equal to or less than the maximum stress thereof was applied to the mixed powder. As a result, a powder green compact was formed in the cavity portion 83 of the green compact forming container 80.

(Extrusion Processing Step)

Moreover, the powder green compact was poured into the cavity portion 93 of the extrusion processing device 90 shown in FIG. 9, and a setting temperature of the die 95 was set to 500° C. and was held for approximately 2 minutes under vacuum atmosphere, the powder green compact was subjected to the extrusion processing. In the extrusion processing, a strain rate was set to 1 $s^{-1}$. Moreover, an extrusion ratio of the extrusion processing was set to 4.

After the extrusion processing was ended, a carbon nanotube composite material was obtained. The obtained carbon nanotube composite material was one, which includes: a metallic base composed of a polycrystalline substance in which a plurality of rod-shaped metallic crystal grains were oriented in a same direction; and carbon nanotube conductive paths composed of the carbon nanotube. The carbon nanotube conductive paths were those which form conductive paths allowing electricity to conduct therethrough in the longitudinal direction of the metallic base by being present in a part of grain boundaries between the rod-shaped metallic crystal grains on a transverse plane of the metallic base, and being present along the longitudinal direction of the metallic base.

FIG. 4 shows transmission electron microscope (TEM) photographs of the transverse plane of the obtained carbon nanotube composite material. FIGS. 4A and 4B are both examples of TEM photographs of the cross section of the carbon nanotube composite material 1, which was obtained by cutting the carbon nanotube composite material 1 along the transverse plane thereof. Note that FIGS. 4A and 4B are a same TEM photograph, in which only assigned reference symbols and numerals are changed.

From FIG. 4A, it is understood that, on the transverse plane of the carbon nanotube composite material 1, the carbon nanotube conductive paths 20 are present in a part of the grain boundary 15 between the rod-shaped metallic crystal grains 11. Moreover, from FIG. 4B, it is understood that the carbon nanotube conductive paths 20, which are present in the region denoted by reference symbol C, are not present in the whole of the grain boundaries 15 between the rod-shaped metallic crystal grains 11, but are present in a part of the grain boundaries 15.

FIGS. 5 and 6 show scanning electron microscope (SEM) photographs of longitudinal cross sections of the obtained carbon nanotube composite material.

From FIG. 5, it is understood that three carbon nanotube conductive paths 20l, 20m and 20n are present continuously along a longitudinal direction L. Moreover, from FIG. 6, it is understood that carbon nanotube conductive paths 20p, 20q, 20r and 20s are formed in a massive form as a result of aggregation of the carbon nanotubes. Moreover, from FIG. 6, it is understood that the two carbon nanotube conductive paths 20p and 20q are present intermittently along the longitudinal direction L, and that the two carbon nanotube conductive paths 20r and 20s are present intermittently along the longitudinal direction L.

(Evaluation)

With regard to the carbon nanotube composite material, conductivity thereof was evaluated in conformity with JIS C3002. With regard to the conductivity, a specific resistance of the carbon nanotube composite material was measured by using a four-terminal method in a thermostat oven held at 20° C. (±0.5° C.), and the conductivity was calculated from this specific resistance. An inter-terminal distance in an event of measuring the specific resistance was set to 1000 mm. Obtained results are shown ion Table 1.

Examples 2 to 4, Comparative Examples 1 and 2

Carbon nanotube composite materials (Examples 2 to 4) or metal materials (Comparative examples 1 and 2) were fabricated in a similar way to Example 1 except that the metal powder in the mixed powder and the compounding amount of the CNT (carbon nanotube) with respect to the metal powder were changed as shown in Table 1.

With regard to the obtained carbon nanotube composite materials (Examples 2 to 4) and the obtained metal materials (Comparative examples 1 and 2), conductivities thereof were calculated in a similar way to Example 1. Obtained results are shown ion Table 1.

From Table 1, it is understood that, when the carbon nanotube composite materials of Examples 1 and 3 and the metal material of Comparative example 1, which were fabricated by using the same metal powder, are compared with each other, the conductivity is enhanced in Examples 1 and 3 than in Comparative example 1. In a similar way, it is understood that, when the carbon nanotube composite materials of Examples 2 and 4 and the metal material of Comparative example 2, which were fabricated by using the same metal powder, are compared with each other, the conductivity is enhanced in Examples 2 and 4 than in Comparative example 2.

The description has been made above of the present invention by the embodiments; however, the present invention is not limited to these, and is modifiable in various ways within the scope of the spirit of the invention.

The carbon nanotube composite material according to this embodiment can be used, for example, as a wire of an automotive harness.

The carbon nanotube composite material according to the present invention has high conductivity and a small compounding amount of the carbon nanotube.

The process for producing the carbon nanotube composite material according to the present invention can produce the carbon nanotube composite material, which has high conductivity and a small compounding amount of the carbon nanotube, in a short time.

What is claimed is:

1. A carbon nanotube composite material comprising:
   a metallic base composed of a polycrystalline substance in which a plurality of rod-shaped metallic crystal grains are oriented in a same direction; and
   a plurality of carbon nanotube conductive paths comprising an intermittent distribution of the carbon nanotube conductive paths throughout the polycrystalline substance, each of the carbon nanotube conductive paths of the plurality of carbon nanotube conductive paths being composed of one or more carbon nanotubes, and each of the carbon nanotube conductive paths forms a conductive path allowing electricity to conduct therethrough in a longitudinal direction of the metallic base by being present in a part of grain boundaries between the rod-shaped metallic crystal grains on a transverse plane of the metallic base, and being present along the longitudinal direction of the metallic base,
   wherein
   the rod-shaped metallic crystal grains are made of aluminum, an aluminum alloy, copper, or a copper alloy, and
   the carbon nanotube conductive paths in the plurality of carbon nanotube conductive paths are spaced apart

TABLE 1

| | Mixed Powder | | Carbon Nanotube |
|---|---|---|---|
| | Type of Metal Powder | Compounding Amount of CNT*1 with respect to Metal Powder (mass %) | Composite Material Conductivity (% IACS) |
| Example 1 | Al Powder (Purity 99.9%) | 1 | 64.2 |
| Example 2 | Al Alloy Powder (JIS A6061-O) | 1 | 48.9 |
| Example 3 | Al Powder (Purity 99.9%) | 0.1 | 62.6 |
| Example 4 | Al Alloy Powder (JIS A6061-O) | 0.1 | 48.0 |
| Comparative Example 1 | Al Powder (Purity 99.9%) | 0 | 62.0 |
| Comparative Example 2 | Al Alloy Powder (JIS A6061-O) | 0 | 47.0 |

*1Carbon Nanotube from one another in the transverse plane of the metallic base such that the carbon nanotube conductive paths partially surround one or more of the plurality of rod-shaped metallic crystal grains in the transverse plane.

2. The carbon nanotube composite material according to claim 1, wherein the plurality of carbon nanotube conductive paths is contained by 0.1 to 1 mass % with respect to the metallic base.

\* \* \* \* \*